Figure 2:
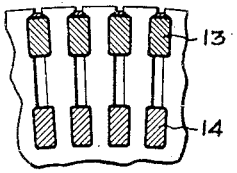

E. F. W. ALEXANDERSON.
SYSTEM OF SHIP PROPULSION.
APPLICATION FILED OCT. 13, 1916.

1,215,095.

Patented Feb. 6, 1917.
2 SHEETS—SHEET 1.

Inventor:
Ernst F. W. Alexanderson,
by Albert G. Davis
His Attorney.

E. F. W. ALEXANDERSON.
SYSTEM OF SHIP PROPULSION.
APPLICATION FILED OCT. 13, 1916.
1,215,095.
Patented Feb. 6, 1917.
2 SHEETS—SHEET 2.
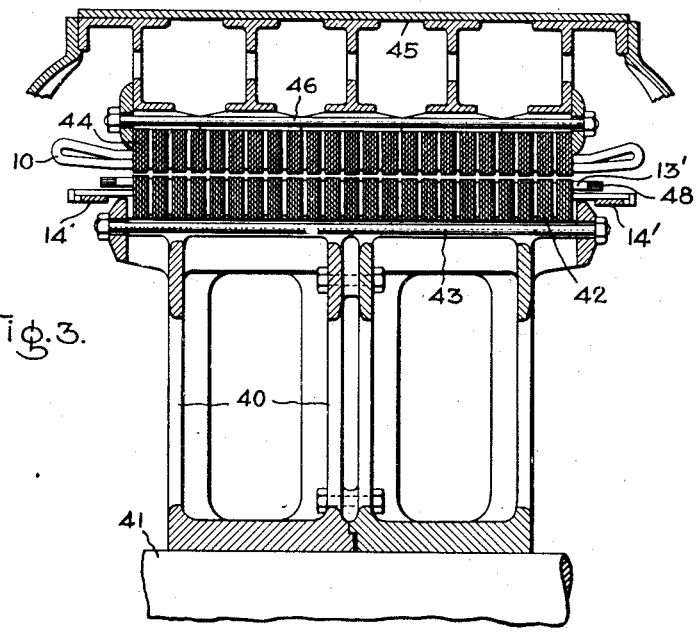
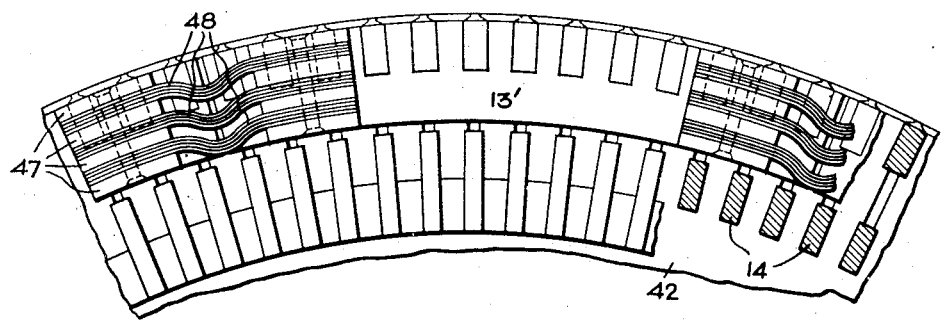
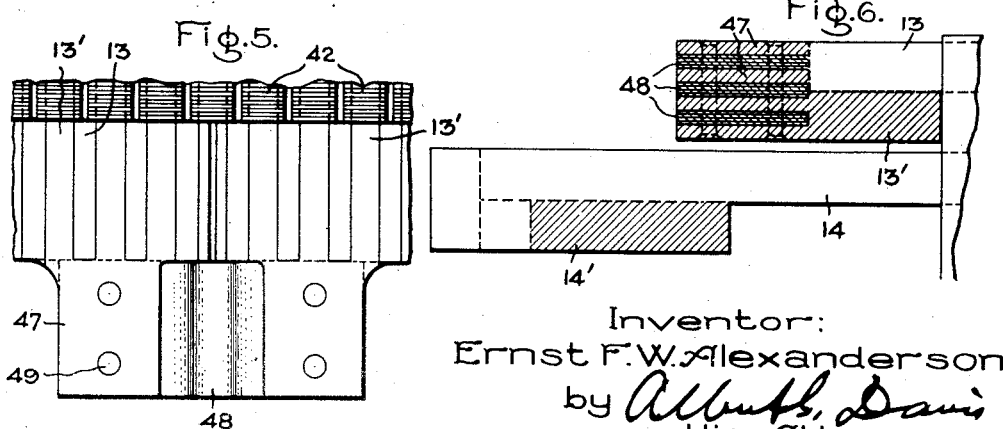
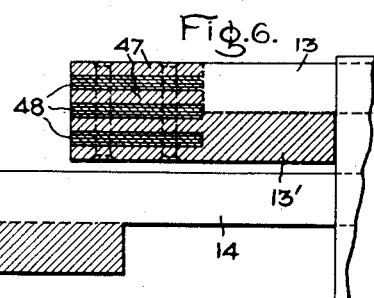
Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF SHIP PROPULSION.

1,215,095. Specification of Letters Patent. Patented Feb. 6, 1917.

Application filed October 13, 1916. Serial No. 125,507.

*To all whom it may concern:*

Be it known that I, ERNST F. W. ALEXANDERSON, a citizen of the United States, residing at Schenectady, county of Schenectady, State of New York, have invented certain new and useful Improvements in Systems of Ship Propulsion, of which the following is a specification.

My invention relates to systems of ship propulsion, and particularly to systems in which the ship's propellers are driven by electric motors. More particularly, my invention relates to systems of electric ship propulsion in which the propellers are driven by induction motors supplied with alternating current from a polyphase alternator.

The present application is in part a continuation of my copending application filed April 26, 1913, Serial No. 763,696.

The object of the invention is to provide an improved system of electric ship propulsion in which the propellers are driven by induction motors having permanently short-circuited secondary windings. More particularly, the object of the invention is to provide an electric system of ship propulsion having propeller-driving induction motors whose secondary members are provided with permanently short-circuited secondary windings adapted to develop sufficient torque for the severest conditions of reversal and to absorb the heat generated in the development of this torque.

The efficient operating speed of a ship's propeller is many times lower than the efficient operating speed of an elastic-fluid turbine. Suitable speed-reducing means must, accordingly, be provided between the turbines and the propellers, and in an electric system of ship propulsion, this speed-reducing means comprises an electric generator coupled to a turbine and delivering electric energy to one or more suitable motors operatively connected to a propeller. The use of alternating current in electric systems of ship propulsion is generally desirable, particularly in the case of large ships, since the generators and motors for alternating current are simpler than those for direct current, and also since alternating current generators can be conveniently designed for larger capacities and higher speeds, and are hence better adapted for use with steam turbines. Obviously, the polyphase induction motor with a low resistance secondary winding of the squirrel cage type would be the most desirable alternating current motor for ship propulsion, but, unfortunately, this simple form of induction motor does not possess the unusual and exacting characteristics required of a satisfactory propeller-driving motor. Electrical and marine engineers have long recognized the failings of the simple squirrel cage induction motor for ship propulsion, and the use of even this type of motor has heretofore been considered entirely impracticable.

I have devoted a great amount of study and have conducted numerous investigations in an endeavor to ascertain the requirements of electric ship propulsion and to provide suitable means for meeting the same, and I have found that the point of view which must be taken in order to design an electric ship propulsion equipment is radically different from the point of view to be taken in the design of ordinary electrical equipments. In fact, the electric ship propulsion equipment is not comparable or analogous to any electrical land equipment with which I am familiar. The ship propulsion equipment is a self-contained installation, and usually a single alternator supplies energy to one or more motors mounted on one propeller shaft, and the maximum capacity of such motors is substantially equal to the maximum output of their alternator. In a ship propulsion equipment, it is essential that everything be done to keep the size, weight, and cost of the equipment down to a minimum, and all other considerations, except efficiency, can be sacrificed. The propeller-driving motors should have the least possible weight, high efficiency, and at the same time sufficient reversing torque to effect reversal of the propellers when the ship is running ahead at full speed. In the case of induction motors, the low weight and high efficiency necessitate the use of low resistance secondary windings, where the slip at normal load is only about one to one and one-half per cent. It is well known that an induction motor with such a low resistance secondary winding has very low starting torque, particularly when the current is limited by the output of an alternator having substantially the same normal output as the motor. From these considerations, it will appear that one of the essential requirements of a propeller-driving induction motor is that its secondary circuit should have a higher effective resistance for reversing, and in some instances for starting, than it has for normal operation. In one of the best known electric propulsion equipments, namely, that of the U. S. collier *Jupiter*, this is accomplished by using a polar-wound secondary winding connected to collector rings so that external resistance can be introduced in the secondary circuit. Such an external resistance is necessarily bulky on account of the very high rate of energy generation in the secondary winding during the reversal from high speeds ahead, and even then the use of such an external resistance would be positively prohibitive on shipboard, on account of its excessive bulk, if some means could not be provided for artificially cooling. Thus, in the *Jupiter* equipment, large water-cooled rheostats of a special construction are provided for inclusion in the secondary winding circuits of the propeller-driving motors during reversal, and the heat generated in attaining the necessary reversing torque is disposed of by the cooling means.

It will be obvious from the foregoing remarks, that the provision of propeller-driving induction motors having permanently short-circuited secondary windings, and in particular short-circuited windings of the squirrel cage type, would be most desirable in electric systems of ship propulsion, but, as far as I am aware, the use of induction motors with permanently short-circuited secondary windings, and *a fortiori* with secondary windings of the squirrel cage type, has not heretofore been successfully or satisfactorily contemplated in any practical system of electric ship propulsion. After a vast amount of study and a most thorough analysis of the practical requirements of propeller-driving motors extending over a period of several years and including numerous experiments, investigations, and calculations, I have conclusively proved the practicability of employing permanently short-circuited secondary windings, even of the squirrel cage type, for propeller-driving induction motors. As the result of my researches, I have discovered and demonstrated that the essential prerequisites for the successful use of a propeller-driving induction motor having a permanently short-circuited secondary winding resides, primarily, in the characteristics of the secondary member of the motor, and, secondarily, in the characteristics of the alternator feeding the motor.

I have found that the most satisfactory performance is obtained by the use of a short-circuited secondary winding having two mechanically independent sections. One of these sections is preferably a squirrel cage winding whose conductor bars have, first, sufficient resistance to give the motor the required torque for reversing, and, second, sufficient mass to provide a large heat-storage capacity. This high resistance section of the secondary winding must be in good thermal relation with the magnetic core of the secondary member, and the mass of this section and of the core must be proportioned to absorb all of the heat developed in obtaining the high torque required in reversing. By absorbing the heat, I mean that the combined mass of the secondary winding and of the secondary magnetic core has a sufficient heat-storage capacity to store-up all the heat generated in the secondary winding during reversal, and that the mass of the secondary winding itself has sufficient heat-storage capacity to take care of the heat generated therein until such heat is radiated to the mass of the secondary core. In other words, in accordance with my present invention, all of the heat generated in the secondary winding circuit during the severest reversing operation of the ship is absorbed or taken care of in the secondary member of the motor, instead of being absorbed by some extraneous apparatus, such as the aforementioned water-cooled rheostats. The second section of the secondary winding is likewise a permanently short-circuited winding, but its resistance is relatively low, and in accordance with my invention, suitable means are provided for obtaining the required selectivity between the two sections of the secondary winding, that is to say, for rendering the high resistance section substantially ineffective during normal operation of the ship and for rendering the low resistance section ineffective during the reversal of the propellers. I am thus able to provide a satisfactory and efficient system of electric ship propulsion which at first blush appears impracticable to those skilled in this art, and I will now briefly describe certain of the peculiar requirements of ship propulsion, and the manner in which I have met these requirements by the employment of a type of apparatus heretofore considered utterly impracticable for ship propulsion purposes.

The severest duty which a propeller-driving motor is called upon to perform is reversing or stopping the ship after full speed ahead. For this duty a very high torque is necessary. Throughout this specification and the appended claims, I have used the words "reversing" and "reversal" to include either the operation of actually reversing the direction of the ship's motion or of stopping the ship. Ordinarily, a ship is propelled in the reverse direction, or backward, only in maneuvering or in emergencies. The extraordinary requirements for reversal are those encountered when the ship must be stopped or reversed when running at full or high speeds ahead, and the particular aim of my present invention is to meet these requirements with simpler, safer, and cheaper apparatus than has ever before been provided for similar purposes.

The starting of a ship from rest is easily accomplished and ordinarily does not require a very high torque. With the ship at rest, the application of a relatively small torque will turn the propellers and start the ship moving, and the speed is gradually picked up by increasing the power delivered to the propellers. The power required for propulsion varies substantially as the cube of the speed, and it will hence be evident that a relatively small amount of power is sufficient to start the ship and propel her at low speeds, as compared with the power required for high and full speeds. A slightly greater starting torque is required for maneuvering about harbors and wharves, but even for ordinary maneuvering, the starting torque requirements are not severe. To effect reversal of the ship when she is running full speed ahead requires, however, a very high torque, and the provision of this high torque results in the delivery of energy at an abnormally high rate to the secondary winding of a propeller-driving induction motor, with the attendant development of heat at an abnormally high rate. The attainment of this very high torque for reversal and the satisfactory disposal of the heat generated in securing this torque are the most difficult problems encountered in the provision of a practical electric system of ship propulsion.

The reversal of a ship's propeller is a peculiar phenomenon, and one which even now is not entirely understood. When a ship is running at full speed ahead and the delivery of power to the propellers is interrupted, the propellers will still continue to rotate in the same direction, but at a slightly lower speed, due to the action of the water on the propellers resulting from the motion of the ship. If power is not again supplied to the propellers, the speed of the ship and hence of the propellers will gradually decrease until the ship comes to rest. Where the propellers are driven by polyphase induction motors and the primary magnetic fields of these motors are reversed while the ship is running ahead at full speed, it will be obvious to those skilled in the art that at the instant of reversal the rotors of the motors are rotating at a speed slightly lower than synchronous speed in a direction opposite to the direction of rotation of the reversed magnetic field. At this instant, the secondary currents have a frequency slightly less than double the frequency of the current supplied to the primary windings of the motors. Where the pole numbers of the primary magnetic fields are increased as well as reversed, it will be obvious that the frequency of the secondary currents will be even higher at the instant of reversal. If the motors have sufficient torque, the propellers will be broken away from the water and their direction of rotation reversed almost instantly. This requires, however, a very high torque and results in the generation of heat at an enormous rate in the secondary circuits of the propeller-driving induction motors. The generation of heat at this rate is, however, of very short duration, and as a result of my researches I have discovered that the amount of heat generated during the act of reversal can be absorbed by the metallic body of the rotor of the motor, and that the transfer of this heat from the conductors of the secondary winding in which it is generated to the magnetic core of the rotor can be rapidly enough effected so that the conductors are not injured. In this connection, I have found that the heat delivered from a conductor bar to the surrounding iron of the rotor core is so great that the bar remains at dark heat, whereas the same bar if exposed to the air becomes white hot and is even likely to melt, while if exposed for only a few inches beyond the rotor core it becomes bright red hot.

The propeller tenaciously holds to its direction of rotation as the result of the motion of the ship, and it is only upon the application of a sufficiently large torque that the propeller can be broken away from the water and its direction of rotation reversed. Where the torque is large enough to break the propeller away from the water its reversal is effected in a very few seconds. If the applied torque is not large enough to effect reversal, the propeller will continue to rotate in the direction determined by the motion of the ship, but as the ship gradually slows down, the required reversing torque decreases until it is equaled and then slightly exceeded by the applied motor torque, whereupon the propeller is almost instantly reversed. It will thus be evident that where time is an element in reversing, the reversing torque of the propeller-driving motors must be sufficiently great to instantly break the propellers away from the water without waiting for the ship to slow down. This, of course, means a more rapid rate of heat generation in the secondary circuit of the motor, but is accompanied by a decreased time interval during which this rate of heat generation is excessive.

In the course of my considerations of the problem of propelling vessels by polyphase induction motors, I have made careful computations of the amount of energy delivered to the secondary winding of such a motor during the act of reversal from full speed ahead, and have found that although the rate at which the energy is delivered is extremely high, the time interval of this high energy delivery is very short, so that the total quantity of heat generated by this energy remains within a certain limit that can be predetermined. I have found even in the worst case conceivable, when an insufficient torque for reversal is delivered by the motor to the propeller, so that the motor fails to instantly reverse the propeller, that the secondary member of the motor can be so proportioned that its heat-storage capacity is sufficiently large to absorb the total amount of heat developed in the secondary winding of the motor during reversal without exceeding the danger limits for heating. The amount of energy in the form of heat developed in the secondary winding of the motor and which must be absorbed is proportional to the torque and also to the slip. If the torque is great, the momentary energy delivered is great, but in that case the motor will overpower the water acting against the propeller and almost instantly bring the speed up from a reverse rotation to a positive slip of about fifty per cent., thus sufficiently reducing the amount of energy to be absorbed so that the propeller can be brought into step with the turbo-alternator while the ship is slowing down without exceeding the permissible quantity of heat energy. If on the other hand, the torque delivered by the motor is too low for reversal, the secondary energy delivery is also lower, but this energy will be delivered to the rotor during a longer time. If, for example, the torque is ten per cent. below the necessary reversing torque, the motor will be driven backward by the propeller until the ship has slowed down sufficiently to reduce the required torque for reversal of the propeller by ten per cent. Inasmuch as the torque of the water against a propeller is proportional to the square of the ship's speed, this will require a slowing down of the ship's speed of about five per cent. If the retarding torque of the propellers under these circumstances is calculated and combined with the retarding effect of the water against the bow of the ship, the number of seconds which will be required for the ship's speed to slow down five per cent. can be predetermined, and the amount of heat generated in the secondary winding of the motor during this period can be integrated. After the condition has been arrived at, when the torque of the motor becomes equal and then slightly greater than the torque of the water on the propeller, the motor will suddenly overpower the propeller and change its speed from a negative to a positive direction, thereby reducing the heating of the secondary winding. Similarly, it can be calculated what will be the total amount of heat delivered to the rotor if the torque of the motor should be twenty per cent., or thirty per cent., or fifty per cent., etc., below the required torque for reversing. The integrated energy in all these cases is lower in proportion as the motor torque is lower, but higher in proportion as more time is required for the ship to decrease its speed until the motor torque is able to overpower the action of the water on the propeller. I have thus found that there is a certain proportion between torque and time which gives a maximum of integrated energy delivered to the secondary winding, and this proportion corresponds to the worst condition possible under which the ship can be reversed. After careful calculations, I have found that even this maximum quantity of heat falls within the permissible limits of heating for the rotor, provided the rotor is constructed with the required heat-storage capacity and to stand a relatively high degree of heat in accordance with the principles of my present invention. Ordinarily, it is not expected that these worst conditions will occur in practice, because the equipment is designed for delivering enough torque to overpower the water immediately, but it is important to know that the equipment is inherently safe, so that it cannot be injured by mistakes in operation.

I have thus discovered that it is possible to provide a propeller-driving induction motor with a permanently short-circuited secondary winding having sufficient effective resistance under the severest conditions of reversal to develop the required reversing torque, and that the secondary member of such a motor can be proportioned so as to satisfactorily absorb the heat generated in the secondary winding during the act of reversal. I have further discovered that a propeller-driving induction motor can be provided with such a secondary member and winding without impairing its normal operation for ship propulsion purposes. By my present invention, the required characteristics for reversal are obtained by the construction and design of the propeller-driving motors, without the use of external rheostats, or other complicated or bulky apparatus. In its broadest aspect, my present invention consists in the combination in an electric system of ship propulsion of an induction motor having a permanently short-circuited secondary winding with the aforementioned characteristics. In carrying out the invention, I provide an alternating current generator arranged to be electrically connected to the primary winding of one or more propeller-driving induction motors, whose secondary members have permanently short-circuited windings and are especially constructed to meet the requirements for reversal. In the first place, the secondary member has a permanently short-circuited secondary winding adapted under reversing conditions to provide a secondary circuit whose effective resistance is sufficiently high to give the motor the very high torque required for reversing, and, in the second place, this secondary winding is so proportioned and so thermally related to the rotor core that the heat generated therein during reversal can be safely absorbed and transferred to the rotor core and temporarily stored during the act of reversal. I thus provide a permanently short-circuited secondary winding of variable effective resistance in which a secondary circuit of relatively low effective resistance is provided under normal running conditions and a secondary circuit of relatively high effective resistance is provided under conditions of reversal. By a winding of variable effective resistance, I mean a winding whose effective resistance is adapted to be varied either as an inherent result of its construction, or as the result of any other appropriate means for securing the required selectivity of effective resistance for normal and reversing operations. This selectivity of the effective resistance of the permanently short-circuited secondary winding can be secured in various ways, and I will particularly mention one way which depends upon the frequency of the secondary currents. When the selectivity of the effective resistance of the secondary winding is dependent upon the frequency of the secondary currents, the secondary winding is constructed, in accordance with my present invention, so as to have an inductively changing effective resistance, that is to say, the effective ohmic resistance of the secondary winding inductively changes so that the effective resistance of the winding is relatively high when the secondary current is of high frequency and relatively low when the secondary current is of low frequency. Another way of securing the desired selectivity is to provide means for changing the poles of the primary winding. Other methods of changing the characteristics of the primary or secondary windings in order to obtain the same results will suggest themselves to those skilled in the art.

Figure 1:
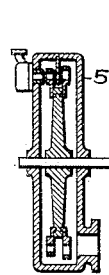

The novel features which I believe to be patentably characteristic of my invention are definitely indicated in the claims appended hereto. The arrangement and design of the apparatus in a system of ship propulsion embodying the novel features of my invention and the operation thereof will be understood from the following description taken in conju...ction with the accompanying drawings, in which;

Figure 1 is a diagrammatic view of the arrangement of apparatus in my improved system of ship propulsion; Fig. 2 is a detail view of a preferred type of permanently short-circuited secondary winding employed in the propeller-driving motors of my system; Fig. 3 is a cross-section of the upper half of a propeller-driving motor of the preferred type; and Figs. 4, 5 and 6 are detail views of the motor illustrated in Fig. 3.

In Fig. 1 of the drawings, there is diagrammatically illustrated an elastic fluid turbine 5 directly coupled to a polyphase alternator. I have shown for the purposes of illustration an alternator of the revolving field type having an exciting winding 6 supplied with direct current from the armature 7 of a separate exciter by means of slip rings 8 and coöperating brushes. The alternator has a polyphase stator winding 9 which is electrically connected to the primary winding 10 of a polyphase induction motor. The rotor 11 of the induction motor is operatively mounted on the shaft 41 of a propeller 12 of the ship. It will, of course, be understood that the ship may and usually will have more than one propeller, and that one or more induction motors may be employed to drive each propeller, and I have merely illustrated one propeller operatively connected to one motor merely for explanatory purposes.

The exciter for the alternator has a field winding 15 which is supplied with direct current from the mains 16. A rheostat 17 having a movable controller 18 is included in the field circuit of the exciter. The rheostat is so designed that when the controller is in one extreme position and coöperating with contact 19 a certain predetermined normal amount of resistance is included in the field circuit of the exciter. When the controller is in the other extreme position and coöperating with contact 20 a greater amount of resistance is included in the field circuit of the exciter. When the controller occupies a third, and preferably an intermediate position, engaging with contact 21, no resistance is included in the field circuit of the exciter, and in this position of the controller the excitation of the alternator is a maximum.

The predetermined amount of resistance included in the field circuit of the exciter when the controller engages with contact 19 is that required to produce normal excitation of the alternator. This is designed to be the excitation under which the alternator operates in the ordinary navigation of the ship, and is, accordingly, the most efficient excitation of the alternator. When the controller engages with contact 21, the minimum amount of resistance, for example, no resistance at all, as illustrated in the drawings, is included in the exciter field circuit. This latter condition is designed to produce a considerable over-excitation of the alternator, and consequently an increase in its terminal voltage. The starting torque of an induction motor varies substantially as the square of the impressed voltage, and it will, therefore, be seen that the over-excitation of the alternator provides a means for obtaining a greatly increased starting torque of the propeller-driving motor.

The reversal of the phase rotation between the motor and alternator, and consequently the reversal of the direction of rotation of the rotor of the induction motor, is effected by the solenoid-operated switches 22 and 23. The windings of the solenoids of these switches are arranged to be connected to the supply main 16 by means of the controller 18 of the rheostat. One terminal of the windings of the solenoids of switches 22 is connected to contact plate 24, and one terminal of the windings of the solenoids of switches 23 is similarly connected to contact plate 25. Contact plate 24 is adapted to be electrically connected to a coöperating plate 24' by the controller and similarly contact plate 25 is adapted to be electrically connected to a coöperating plate 25'. The plates 24' and 25' are connected to one side of the supply main 16, while the other terminals of the windings of the solenoids of switches 22 and 23 are connected to the other side of the supply mains 16.

When the controller 18 bridges contact plates 24 and 24', the solenoids of switches 22 are energized and the switches 22 are closed, while the solenoids of switches 23 are deënergized and the switches 23 open. Similarly, when the controller bridges contact plates 25 and 25', the solenoids of switches 23 are energized and the switches 23 are closed and the switches 22 open. In this manner, the phase rotation of the motor with respect to the alternator is reversed. It will be observed that the rheostat is symmetrically arranged so as to provide the same regulation of the excitation of the alternator for both directions of rotation of the rotor 11.

The arrangement of the resistance in the rheostat is such that the reversal of the phase rotation of the motor is effected when the alternator is substantially unexcited. This is accomplished by opening the field circuit of the exciter when the controller 18 moves from contact plate 24 to contact plate 25, or vice-versa. In case it is not desired to completely open the field circuit of the exciter when the controller is moved from contact plate 24 to contact plate 25, an excessive amount of resistance can be included in the circuit during this movement. A solenoid-operated switch 26 is arranged to short-circuit a resistance 27 permanently connected in series with the armature 7 of the exciter and the exciting winding 6 of the alternator. The solenoid of the switch 26 is included in series with either the solenoid windings of switches 22 or switches 23, and is accordingly energized, and the switch 26 closed, when the controller 18 engages with either contact plate 24 or contact plate 25. The object of the switch 26 and the resistance 27 is to introduce a resistance in the field circuit of the alternator when the field circuit of the exciter is opened, thus preventing the production of a dangerous current in the former circuit when the alternator field collapses.

The propeller-driving induction motor is designed to give the characteristics hereinbefore mentioned. To this end, the construction of the secondary member of the motor and particularly the construction of its secondary winding is an essential feature of my improved system. In accordance with my present invention, the secondary winding is a permanently short-circuited winding of variable effective resistance, and suitable means are provided, either in the inherent design of the secondary winding, or otherwise, for rendering the effective resistance of this winding relatively low under normal conditions of navigation and relatively high when the propeller is to be reversed, and further the secondary member of the motor is constructed and proportioned to absorb the heat generated in the secondary winding during the reversal of the propeller. I have herein illustrated and described a secondary winding of inductively changing effective resistance for securing the desired selectivity of the effective resistance. Numerous constructions and arrangements of the secondary winding for obtaining an inductively changing current distribution in the secondary circuit, and hence an inductively changing effective resistance, will suggest themselves to those skilled in the art. Primarily, the motor must be constructed so that its secondary circuit has a relatively high effective resistance when the secondary current is of high frequency, and, secondarily, so that its secondary circuit has relatively low effective resistance when the secondary current is of low frequency. It will, of course, be understood that I mean by "secondary current of high frequency" current of that frequency induced in the secondary winding when the slip of the motor is relatively large, and by "current of low frequency" current of that frequency induced in the secondary winding when the slip of the motor is relatively small. I believe that such a secondary winding of inductively changing effective resistance can best be obtained by constructing the winding of two separate and mechanically independent sections. Each section in reality constitutes a complete winding in itself, but I have, unless otherwise noted, used the expression "secondary winding" in the specification and claims of this application to cover the entire secondary winding regardless of the number of independent sections into which such winding is divided. One section of my preferred construction of secondary winding has relatively high ohmic resistance and low reactance, while the other section has relatively low ohmic resistance and high reactance.

I have employed the expression "relatively high resistance" to designate the effective resistance of the secondary winding under certain conditions with relation to its effective resistance under other conditions and without regard to the actual value of the resistance. It will, accordingly, be understood that the word "relative", as employed in the specification and claims, refers to the relative resistance of the secondary winding under different conditions, as when the frequency of the secondary current is high or low, and, in other cases, to the relative resistance of different sections of the secondary winding.

In the drawings I have designated the relatively high resistance winding by reference character 13 and the relatively low resistance winding by reference character 14. The high resistance winding is located in slots near the surface of the rotor and has little inductance. On the other hand, the low resistance winding is located in slots well beneath the surface of the rotor and being substantially embedded in the magnetic material of the rotor has high inductance. The arrangement of the conductor bars of the secondary winding will be clearly understood by reference to the drawings. The two sections of the secondary winding are mechanically independent, and each is of the well known squirrel cage type.

In Figs. 3, 4, 5 and 6, of the drawings, I have illustrated a practical construction of propeller-driving induction motor designed in accordance with my present invention for a large vessel. The spider 40 of the rotor of this motor is keyed or otherwise suitably secured to the propeller shaft 41. The laminations of the rotor core 42 are clamped to the spider by bolts 43. The laminations of the stator core 44 are secured to the stator frame 45 by bolts 46. The polyphase primary winding 10 of the motor is carried in suitable slots in the stator core 44. The conductor bars of the low resistance squirrel cage winding 14 extend beyond the rotor core, and are welded or otherwise suitably secured to low resistance end rings 14'. The end rings of the high resistance squirrel cage winding 13 are snug against the rotor core, so that all parts of this winding are in good thermal contact with the core. The end rings of the winding 13 are constructed of relatively short flexibly-connected sector-shaped members 13', so as to permit of the expansion of the end rings as a result of the heat generated during reversal. In Fig. 4 I have shown one complete member 13' and its connection to the two adjacent members. The members 13' are provided with rectangular slots for the accommodation of the high resistance conductor bars, which latter may be welded or otherwise suitably secured to the members. Each sector-shaped member 13' has near each end thereof a series of super-imposed tongues or projections 47. In the particular construction illustrated in the drawings, there are four such projections near the end of each member. Flexible laminated conducting strips 48 are secured to the projections 47 by means of rivets or bolts 49. The laminated conducting strips 48 thus electrically connect adjacent members, and these strips are so bent as to permit of a certain circumferential expansion of the members.

It will be understood by those skilled in the art that other arrangements of the sections of the secondary winding may be made without departing from the spirit of my invention. It will further be understood that a winding having two sections is not necessary, and I have merely described and illustrated such a winding as constituting what I now consider the preferred construction in a motor possessing the necessary characteristics essential to the successful operation of my invention. Those skilled in the art will realize that the same characteristics may be obtained by the use of a properly designed secondary winding of one section, and I consider my invention of sufficient breadth to include the use in my system of ship propulsion of any induction motor possessing the characteristics hereinbefore emphasized.

On account of its high self-induction, the low resistance winding 14 will carry very little current when the frequency of the secondary current is high, and consequently under this condition the secondary current will be forced into the high resistance winding 13, thus producing a satisfactory torque of the motor when the slip is large. On the other hand, as the frequency of the secondary current diminishes, more and more current will flow in the conductor bars of the low resistance winding 14 until at normal slip substantially all of the secondary current is carried by this winding, and the motor has the desirable running characteristics of an induction motor with an ordinary low resistance squirrel cage winding. It will thus be seen that the current distribution of the secondary current is automatically changed by inductive action to produce the desired operating characteristics for all speeds of the ship.

The effect of the secondary winding illustrated herein is to give normal slip of the motor and efficiency of at least 95 per cent. under full load, and a speed-torque curve so shaped that the torque when the motor is standing still is about 70 per cent. of the full load running torque with about twice the normal current in the primary circuit. The generator is proportioned to give this abnormal current to the motor. To do so, however, requires some additional excitation. This additional excitation is provided when the controller 18 coöperates with contact 21, under which condition no resistance is included in the field winding of the exciter and the alternator is operating with maximum excitation. This over-excitation is of such an amount as to render the operation of the alternator inefficient if such a strong field were constantly maintained and, accordingly, the rheostat is provided with contact 19 which is designed when the controller 18 coöperates therewith to furnish the normal and most efficient excitation for the alternator.

Under normal operating conditions of the ship, the controller 18 will coöperate with contact 19. The controller is preferably arranged to be locked in this position, since it will be the normal position of the controller when the ship is navigating at normal speed. In the drawings, I have shown a lug 28 on the controller adapted to engage with spring catches 29 for holding the controller in engagement with either of the contacts 19.

A spring 30 is operatively connected to the controller and tends to maintain the controller in an off-position, that is, with the field circuit of the exciter open. The controller is, therefore, arranged, through the action of the spring 30, to coöperate with contact 21 only when manually held in engagement with this contact. The spring thus tends to resist the movement of the controller into engagement with contact 21 so that the condition of over-excitation of the alternator can be maintained only by manual control.

It is important that the conductor bars of the high resistance winding intended for absorbing the high rate of heat delivered in reversing the ship should be entirely embedded in the iron without any part thereof being exposed. The conductor bars of this winding are, therefore, completed through an end ring which is placed in close contact with the body of the laminated rotor core. In order to make the high resistance squirrel cage construction perfectly safe, it is, furthermore, important that the weight and cross-section of the high resistance conductor bars should be great enough to absorb the instantaneous values of heat delivery during a sufficient number of seconds, so that a transfer from the resistance bar to the rotor core will become effective before the bar has become too hot. In order to meet these requirements, it has been found necessary to use a resistance material with much higher specific resistance than ordinarily used in squirrel cage windings. I have found that the material of the high resistance winding should ordinarily have a specific resistance of at least fourteen times that of copper. German silver with a specific resistance of about twenty times that of copper has been found very well suited for the conductor bars of the high resistance winding. The mass of material employed in the two sections of the secondary winding is thus designed to give a considerable heat storage capacity. In fact, the proportions of this winding are such that the heat storage capacity in the conductors thereof alone is sufficient to cover a two minute reversal operation with maximum excitation of the alternator without producing temperature rises that could be considered objectionable. This heat storage capacity together with such heat removal and storage as is afforded by the rotor core of the motor will make the interval of safe reversal about three or four minutes, which is an entirely sufficient time for any navigating needs.

From the foregoing description it will be evident that the high resistance component of the secondary winding is preferably a squirrel cage winding, while the low resistance component may or may not be a squirrel cage winding. In any event, the low resistance component is always a permanently short-circuited winding, so that the necessity for collector rings and external resistances is dispensed with. This is one of the important features of my present invention, and distinguishes it from all other practical systems of electric ship propulsion with which I am familiar. Whereas heretofore, the heat resulting from the energy delivered to the secondary winding of the motor has been absorbed and dissipated in an external resistance, in accordance with my present invention, the secondary member of the motor is so constructed and proportioned with respect to its heat storage capacity that all of the heat generated in the secondary winding is absorbed by the secondary member. As previously emphasized, the heat storage capacity of the secondary member is sufficient to absorb and store all of the heat generated in the secondary winding during reversal, and the subsequent rotation of this member assists in radiating this stored-up heat without injuring the motor or any other apparatus in the system.

I am well aware that the particular type of motor which I have found peculiarly applicable for ship propulsion purposes is more or less generally known in the art. But as far as I am aware, I am the first to appreciate that such a motor could be built for satisfactory use in systems of electric ship propulsion, and I also believe I am the first to devise a practical system of electric ship propulsion employing induction motors with permanently short-circuited secondary windings. Ordinarily, induction motors are fed from substantially constant potential mains, and practical specifications always designate a minimum breakdown torque, a minimum power factor, and a minimum starting torque. The breakdown torque depends only upon the leakage reactance of the motor winding, being inversely proportional to the leakage reactance. The power factor depends upon the leakage reactance as well as the magnetizing current, while the starting torque depends upon the leakage reactance and the resistance of the secondary circuit. A practical motor design for ordinary purposes, therefore, consists in a compromise between leakage reactance, magnetizing current, and secondary resistance.

Motors having secondary windings of inductively changing effective resistance have been known in the art for many years, but have, heretofore, found no practical applications, because the additional inductance of the secondary winding, in order to be effective, must be of about the same magnitude, or perhaps greater, than the leakage reactance of the ordinary motor windings. The total reactance of the motor, therefore, becomes about twice as great as the reactance of an ordinary motor, and the breakdown torque is, accordingly, only about half as great. The requirement of meeting a certain breakdown torque is usually the most severe in induction motor design. The art of induction motor manufacture has, therefore, gone to great refinements to sub-divide the winding in small slots, the shape of which is carefully studied, and the cost and size of a motor depends largely upon the severity of the requirements which are to be met. It is, therefore, obvious that a scheme for increasing the starting torque which places the motor in an entirely different class, as far as meeting the most essential requirements in the present day art of induction motor design, has not been looked upon with favor, and has even been discounted as practically worthless.

As previously pointed out, the motor requirements for electric ship propulsion are entirely different than met with in any other electrical installation with which I am acquainted, and everything, except efficiency, can be sacrificed to keep the size, weight, and cost of the equipment down to a minimum. The steam turbine for a ship propulsion equipment is thus designed to meet the requirements of efficiency and lightness as far as possible, and it, therefore, becomes a very high-speed unit in proportion to its output. The frequency of the system must be selected so as to give the most efficient motor characteristics. The lowest frequency that can be obtained from any generator at a particular speed, is the one that results when the generator is built with two poles. The turbo-generating unit of a ship propulsion equipment, therefore, necessarily becomes a high-power high-speed unit with a bi-polar generator. The diameter of the rotating field structure of the generator is limited on account of centrifugal strains, and, therefore, generators can be built for high output and high speed only by selecting constructions which make possible the use of a great active length of the magnetic material. The difficulty in cooling becomes proportionally great because the openings through which air can be introduced are limited by the diameter. Thus, the limits in alternator design are first reached in the limit of the field excitation that can be placed on the rotating member without excessive heating. With the dimensions of the excitation and of the rotor determined, the problem is to get as large power as possible from this structure. The question of voltage regulation, which was much discussed in the early development of the electrical industry, is of no importance in ship propulsion, and the stationary armature winding of the alternator is designed so that a maximum amount of energy can be generated. This result is accomplished when the ampere turns of the armature reaction begin to be of the same magnitude as the ampere turns of the field, which latter, as just shown, is limited by the structure of the field.

The result is that the alternator in the system of electric ship propulsion operates practically at its maximum output, and the motors must be designed from the point of view that they can get the maximum current which the alternator can deliver and no more. While in the ordinary constant potential system of motor operation, the leakage reactance of the motor determines the overload capacity, this consideration is of no importance in a system of electric ship propulsion, because the leakage reactance in the motor windings is very small compared with the synchronous impedance of the alternator, and the effect of more or less reactance in the motor is only to apparently increase the total impedance of the circuit by a few per cent. The motors are constructed to produce as great torque as possible with the current that the alternator is built to deliver. The torque that can be obtained, therefore, depends essentially upon how much current is available, and, secondly, upon how efficiently this current can be used.

As hereinbefore explained, the armature reaction of the alternator is of substantially the same magnitude as the field excitation. Therefore, the current delivered by the alternator is substantially proportional to the field excitation. While the alternator operates normally with a field excitation which is limited by heating an efficiency of the whole system, it is possible at any time to materially increase the motor torque by increasing the alternator excitation. It is, accordingly, proposed to do this wherever necessary for reversing or maneuvering. The torque of the motor that can be obtained at any particular speed between standstill and full speed depends almost entirely upon the effective resistance of the secondary circuit, and is, as before stated, almost independent of the reactance of the motor. A motor design best suited for electric ship propulsion should, therefore, be such as to have as great an effective secondary resistance as possible at speeds between standstill and full speed, and as low an effective secondary resistance as possible at full speed. The motor design, therefore, becomes a compromise between these varying requirements, but it will be evident from the foregoing that these requirements are entirely different from those encountered in ordinary motor operations, and the means and considerations for meeting the same are radically different.

During reversal and also during the starting and accelerating stages of the ship the power factor of the propeller-driving motors is low and the kilovolt-amperes required to produce the necessary starting and accelerating torque will be approximately fifty per cent. greater than the normal kilovolt-amperes required when the motors are running at full speed. These increased kilovolt-amperes could of course be obtained by providing an alternator having a normal rated kilovolt-ampere capacity fifty per cent. greater than required for normal navigating operation of the propeller-driving motors. I prefer, however, to obtain this increased kilovolt-ampere output of the alternator by forcing the excitation of the alternator, that is, by over-exciting the alternator as hereinbefore mentioned. The alternator is, therefore, designed so that its kilovolt-ampere output under the most efficient operating conditions is substantially equal to the kilovolt-ampere demand of the propeller-driving motors during normal navigation, and also so that the excitation of the alternator can be forced to produce a kilovolt-ampere output fifty per cent. greater than the normal kilovolt-ampere output. The alternator is further designed so that its kilovolt-ampere output at low voltage is great enough to maintain the desired corresponding speed of the propeller-driving motors. The over-excitation of the alternator for accentuating the torque of the propeller-driving motor or motors forms the subject matter of my co-pending application filed April 26, 1913, Ser. No. 763,696.

Those skilled in the art will appreciate that my invention is susceptible of numerous modifications, and accordingly, I do not desire to limit myself to the particular arrangement and design of apparatus herein described. I, therefore, aim in the appended claims to cover all modifications which are within the spirit and scope of my invention.

What I claim as new and desire to secure by Letters Patent of the United States, is:

1. An electric system of ship propulsion comprising in combination, an alternating current generator, an induction motor electrically connected to said generator and having a secondary member including a permanently short-circuited secondary winding of variable effective resistance, a propeller operatively connected to said motor, means for reversing the direction of rotation of the motor and of the propeller, the effective resistance of said secondary winding being relatively low during normal conditions of navigation and being sufficiently high when the propeller is to be reversed to develop a torque large enough to break the propeller away from the water and effect its reversal, said secondary member being proportioned to absorb the heat generated in said secondary winding during the reversal of the propeller.

2. An electric system of ship propulsion comprising in combination, an alternating current generator, an induction motor electrically connected to said generator and having a magnetic core carrying a permanently short-circuited secondary winding, a propeller operatively connected to said motor, means for reversing the direction of rotation of the motor and of the propeller, the effective resistance of said short-circuited secondary winding being relatively low under normal navigating conditions and being relatively high during the reversal of the propeller, the heat storage capacity of said magnetic core and of said secondary winding being large enough to absorb the heat generated in the latter during the reversal of the propeller.

3. An electric system of ship propulsion comprising in combination, an alternating current generator, an induction motor electrically connected to said generator and having a magnetic core carrying a permanently short-circuited secondary winding of variable effective resistance, a propeller operatively connected to said motor, and means for reversing the direction of rotation of the motor and of the propeller, the effective resistance of said secondary winding being relatively low during normal conditions of navigation and relatively high during the reversal of the propeller, said magnetic core and said secondary winding being proportioned to absorb the heat generated in the latter during the reversal of the propeller.

4. An electric system of ship propulsion comprising in combination, an alternating current generator, an induction motor electrically connected to said generator and having a permanently short-circuited secondary winding composed of two components one of which is a squirrel cage winding of relatively high resistance, a propeller operatively connected to said motor, means for reversing the direction of rotation of the motor and of the propeller, said high resistance squirrel cage winding constituting a principal part of the effective secondary winding circuit during the reversal of the propeller.

5. An electric system of ship propulsion comprising in combination, an alternating current generator, an induction motor electrically connected to said generator and having a short-circuited secondary winding composed of two components one of which is a squirrel cage winding of relatively high resistance while the other component is a permanently short-circuited winding of relatively low resistance, a propeller operatively connected to said motor, means for reversing the direction of rotation of the motor and of the propeller, the effectiveness of the resistance of said secondary winding being determined by its low resistance component during normal conditions of navigation and by its high resistance component during the reversal of the propeller.

6. An electric system of ship propulsion comprising in combination, an alternating current generator, an induction motor electrically connected to said generator and having a magnetic core carrying a secondary winding composed of two components one of which is a squirrel cage winding of relatively high resistance and the other a permanently short-circuited winding of relatively low resistance, a propeller operatively connected to said motor, means for reversing the direction of rotation of the motor and of the propeller, the effective resistance of said secondary winding being determined by its low resistance component during normal conditions of navigation and by its high resistance component during the reversal of the propeller, said magnetic core and said secondary winding being proportioned to absorb the heat generated in the latter during the reversal of the propeller.

7. An electric system of ship propulsion comprising in combination, an alternating current generator, an induction motor electrically connected to said generator and having a magnetic core carrying a secondary winding composed of two components one of which is a squirrel cage winding of relatively high resistance and the other a permanently short-circuited winding of relatively low resistance, a propeller operatively connected to said motor, means for reversing the direction of rotation of the motor and of the propeller, the effective resistance of said secondary winding being determined by its low resistance component during normal conditions of navigation and by its high resistance component during the reversal of the propeller, the conductor bars and end rings of said squirrel cage winding being in intimate thermal contact with said core and the heat storage capacity of this winding and of the core being large enough to absorb the heat generated during the reversal of the propeller.

8. An electric system of ship propulsion comprising in combination, an alternating current generator, an induction motor electrically connected to said generator and having a magnetic core carrying a permanently short-circuited secondary winding of inductively changing effective resistance, a propeller operatively connected to said motor, and means for reversing the direction of rotation of the motor and of the propeller, the heat storage capacity of said magnetic core and of said secondary winding being large enough to absorb the heat generated in the latter during the reversal of the propeller.

9. An electric system of ship propulsion comprising in combination, an alternating current generator, an induction motor electrically connected to said generator and having a secondary member including a permanently short-circuited secondary winding of inductively changing effective resistance, and a propeller operatively connected to said motor, the heat storage capacity of said secondary member being large enough to absorb the heat generated in said secondary winding when the effective resistance of the latter is relatively high.

10. An electric system of ship propulsion comprising in combination, an alternating current generator, an induction motor electrically connected to said generator and having a magnetic core carrying a permanently short circuited secondary winding of relatively high effective resistance when the secondary current is of high frequency and of relatively low effective resistance when the secondary current is of low frequency, and a propeller operatively connected to said motor, the heat storage capacity of said magnetic core and of said secondary winding being large enough to absorb the heat generated in the latter when the frequency of the secondary current is relatively high.

11. An electric system of ship propulsion comprising in combination, an alternating current generator, an induction motor electrically connected to said generator and having a magnetic core carrying a permanently short-circuited secondary winding of two sections, one section of said secondary winding having relatively high resistance and low reactance and the other section of said secondary winding having relatively low resistance and high reactance, a propeller operatively connected to said motor and means for reversing the direction of rotation of the motor and of the propeller, the heat storage capacity of said magnetic core and of said secondary winding being large enough to absorb the heat generated in the latter during the reversal of the propeller.

12. An electric system of ship propulsion comprising in combination, an alternating current generator, and induction motor electrically connected to said generator and having a magnetic core carrying a relatively high resistance permanently short-circuited secondary winding located near the surface of the core and a relatively low resistance permanently short-circuited secondary winding located beneath the surface of the core, a propeller operatively connected to said motor, and means for reversing the direction of rotation of the motor and of the propeller, the heat storage capacity of said magnetic core and of said windings being large enough to absorb the heat generated in the latter during the reversal of the propeller.

In witness whereof, I have hereunto set my hand this 11th day of October, 1916.

ERNST F. W. ALEXANDERSON.